(12) United States Patent
Onishi et al.

(10) Patent No.: US 8,891,333 B2
(45) Date of Patent: Nov. 18, 2014

(54) OSCILLATOR AND ELECTRONIC DEVICE

(75) Inventors: Yasuharu Onishi, Tokyo (JP); Jun Kuroda, Tokyo (JP); Motoyoshi Komoda, Tokyo (JP); Shigeo Satou, Tokyo (JP); Yukio Murata, Tokyo (JP); Yuichiro Kishinami, Tokyo (JP); Nobuhiro Kawashima, Tokyo (JP)

(73) Assignee: NEC Corporation, Tokyo (JP)

( * ) Notice: Subject to any disclaimer, the term of this patent is extended or adjusted under 35 U.S.C. 154(b) by 19 days.

(21) Appl. No.: 13/703,718

(22) PCT Filed: Jul. 14, 2011

(86) PCT No.: PCT/JP2011/004035
§ 371 (c)(1),
(2), (4) Date: Dec. 12, 2012

(87) PCT Pub. No.: WO2012/011256
PCT Pub. Date: Jan. 26, 2012

(65) Prior Publication Data
US 2013/0083630 A1   Apr. 4, 2013

(30) Foreign Application Priority Data
Jul. 23, 2010 (JP) .................................. 2010-166549

(51) Int. Cl.
*H02N 2/00* (2006.01)
*G01S 15/08* (2006.01)
*H04R 17/00* (2006.01)

(52) U.S. Cl.
CPC ............... *H02N 2/001* (2013.01); *H04R 17/00* (2013.01); *G01S 15/08* (2013.01)

USPC ............................................................ 367/99

(58) Field of Classification Search
CPC ......... H02N 2/001; H04R 17/00; G01S 15/08
USPC ............................................. 367/99; 310/322
See application file for complete search history.

(56) References Cited

U.S. PATENT DOCUMENTS

| 6,865,785 B2 | 3/2005 | Ogura et al. |
| 2013/0083630 A1* | 4/2013 | Onishi et al. ................... 367/99 |

FOREIGN PATENT DOCUMENTS

| EP | 2597894 A1 * | 5/2013 |
| JP | 59-144997 U | 9/1984 |

(Continued)

OTHER PUBLICATIONS

Communication dated Sep. 30, 2014, from the Japanese Patent Office in counterpart Japanese Application No. 2012525314.

*Primary Examiner* — Daniel Pihulic
(74) *Attorney, Agent, or Firm* — Sughrue Mion, PLLC

(57) ABSTRACT

An elastic vibration plate (110) is divided into a plurality of elastic vibrating regions (112) through slits (111) having a predetermined shape, a plurality of piezoelectric vibrators (120) which are individually mounted on at least some of the plurality of elastic vibrating regions (112) on the elastic vibration plate (110) undergo elastic vibration due to application of an electric field. Therefore, it is possible to vibrate the plurality of elastic vibrating regions (112) on a single elastic vibration plate (110) using the plurality of piezoelectric vibrators (120). Therefore, it is possible to adjust the peak value and the like of the oscillation frequency at will in each of the plurality of elastic vibrating regions.

9 Claims, 18 Drawing Sheets

(56) References Cited

FOREIGN PATENT DOCUMENTS

| | | |
|---|---|---|
| JP | 02-141098 A | 5/1990 |
| JP | 03-270282 A | 12/1991 |
| JP | 2001-016692 A | 1/2001 |
| JP | 2002135893 A | 5/2002 |
| JP | 2006-211413 A | 8/2006 |
| WO | 2005006809 A1 | 1/2005 |
| WO | 2007/026736 A1 | 3/2007 |
| WO | 2007/083497 A1 | 7/2007 |
| WO | WO2012011256 * | 1/2012 |

* cited by examiner

OSCILLATOR AND ELECTRONIC DEVICE

CROSS REFERENCE TO RELATED APPLICATIONS

This application is a National Stage of International Application No. PCT/JP2011/004035, filed on Jul. 14, 2011, which claims priority from Japanese Patent Application No. 2010-166549, filed Jul. 23, 2010, the contents of all of which are incorporated herein by reference in their entirety.

TECHNICAL FIELD

The present invention relates to an oscillator having a piezoelectric vibrator, and particularly to an oscillator having a piezoelectric vibrator mounted on an elastic vibration plate and an electronic device having the oscillator.

BACKGROUND ART

In recent years, the need for mobile electronic devices such as mobile phones and notebook computers has been increased. For such electronic devices, development of thin mobile terminals having audio functions as commodity values such as television phones, video playing, and hands-free phones is underway. Within such development, there is an increasing demand for high sound quality and a decrease in the size and thickness of an electroacoustic transducer (a speaker device) which is an acoustic component.

Currently, in electronic devices such as mobile phones, an electrodynamic electroacoustic transducer is used as the electroacoustic transducer. The electrodynamic electroacoustic transducer is configured by permanent magnets, voice coils, and vibrating diaphragm.

However, the electrodynamic electroacoustic transducer has a limitation on reduction of thickness due to its operating principle and structure. Meanwhile, Patent Documents 1 and 2 describe use of a piezoelectric vibrator as the electroacoustic transducer.

In addition, as additional examples of an oscillator using a piezoelectric vibrator, apart from a speaker device, a variety of electronic devices such as a sound wave sensor that detects the distance and the like to a subject using sound waves emitted from a piezoelectric vibrator (refer to Patent Document 3), are also known.

RELATED DOCUMENT

Patent Document

[Patent Document 1] Domestic re-publication of PCT international application No. 2007-026736
[Patent Document 2] Domestic re-publication of PCT international application No. 2007-083497
[Patent Document 3] Japanese Unexamined patent publication No. 03-270282

DISCLOSURE OF THE INVENTION

An oscillator using a piezoelectric vibrator uses the piezoelectric effect of a piezoelectric material and generates vibration amplitudes from electrostrictive action caused by input of electric signals. In addition, while the electrodynamic electroacoustic transducer generates vibrations using piston-like reciprocal motions, the oscillator using a piezoelectric vibrator has a bending mode of vibration and thus a lower amplitude. Therefore, the oscillator is superior to the above-mentioned electrodynamic electroacoustic transducer for decreasing thickness.

However, the oscillation frequency, which is one of the physical indexes of the oscillator, is dependent on the shape and the like of the vibrator. Therefore, in the case of the oscillator using a piezoelectric vibrator, the oscillation frequency becomes liable to have a specific peak value, and it has been difficult to freely adjust the oscillation frequency.

The invention has been made in light of the above-mentioned problems, and provides an oscillator in which the peak value and the like of the oscillation frequency can be adjusted at will in each of a plurality of elastic vibrating regions.

The oscillator of the invention has an elastic vibration plate which is divided into a plurality of elastic vibrating regions through slits, a supporting member that supports the plurality of elastic vibrating regions at a non-slit location, and a plurality of piezoelectric vibrators which are individually mounted on at least some of the plurality of elastic vibrating regions supported by the supporting member and undergo elastic vibration due to application of an electric field.

A first electronic device of the invention has the above-mentioned oscillator and an oscillation driving portion that causes the oscillator to output audible sound waves.

A second electronic device of the invention has the oscillator, an ultrasonic detection portion that detects ultrasonic waves which are emitted from the oscillator and reflected by a measurement subject, and a distance measurement portion that computes the distance to the measurement subject from the detected ultrasonic waves.

According to the oscillator of the invention, it is possible to adjust the peak value and the like of the oscillation frequency at will in each of a plurality of elastic vibrating regions.

BRIEF DESCRIPTION OF THE DRAWINGS

The above-mentioned object, as well as other objects, characteristics, and advantages will be further clarified using preferable embodiments described below and the accompanying drawings below.

DESCRIPTION OF EMBODIMENTS

Figure 1:
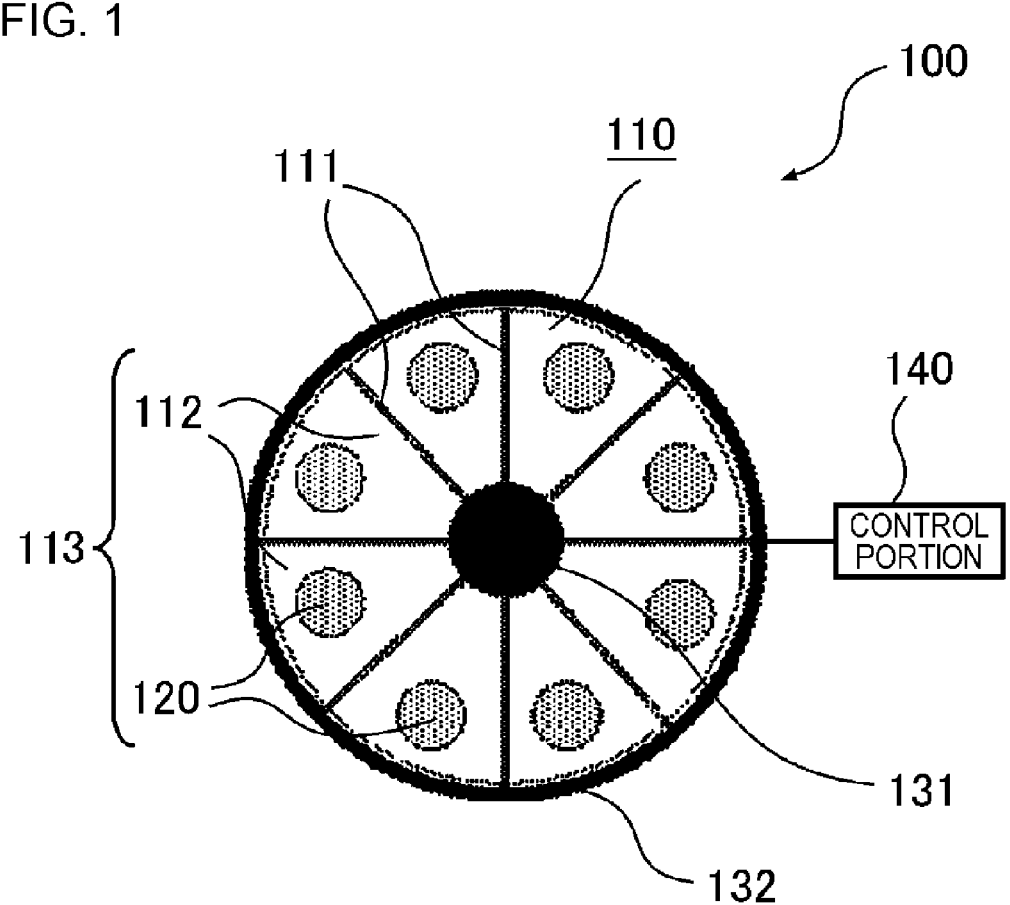
FIG. 1 is a plan view illustrating the structure of an electroacoustic transducer which is an oscillator of a first embodiment of the invention.
Figure 2:
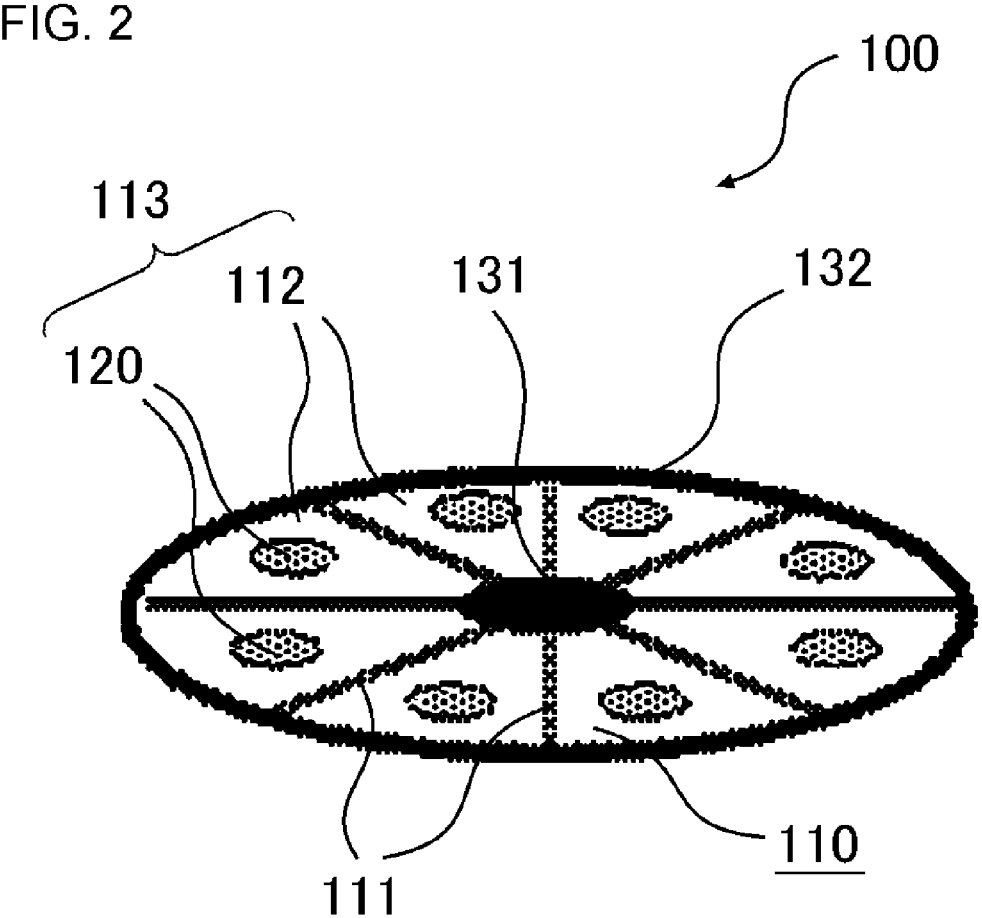
FIG. 2 is a schematic perspective view illustrating the structure of the electroacoustic transducer.
Figure 3:
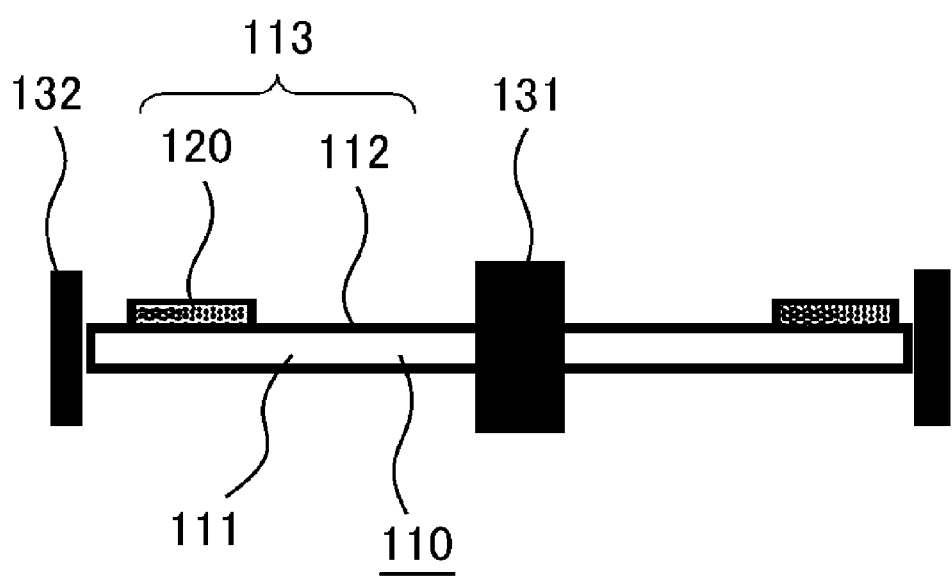
FIG. 3 is a vertical front cross-sectional view illustrating the structure of the electroacoustic transducer.

A first embodiment of the invention will be described with reference to FIGS. 1 to 9. FIG. 1 is a schematic top view illustrating an electroacoustic transducer 100 which is an oscillator of the present embodiment, FIG. 2 is a schematic perspective view, and FIG. 3 is a schematic sectional view.

As shown in the drawings, the electroacoustic transducer 100 which is an oscillator of the embodiment has an elastic vibration plate 110 divided into a plurality of elastic vibrating regions 112 through slits 111 having a predetermined shape, a central supporting spindle 131 which is a supporting member that supports the plurality of elastic vibrating regions 112 at a non-slit 111 location, a plurality of piezoelectric vibrators 120 which is individually mounted on at least some of the plurality of elastic vibrating regions 112 supported by the central supporting spindle 131 and undergo elastic vibration due to application of an electric field. Meanwhile, in the embodiment, the slit refers to an incision, and does not necessarily need to have a width. In addition, the portions of the elastic vibrating regions 112 supported by the central supporting spindle 131 are present at the end portion of the incision.

Furthermore, the round elastic vibration plate 110 is formed, and is divided into a plurality of fan-like elastic vibrating regions 112 using a plurality of radial slits 111. As shown in FIG. 3, the plurality of fan-like elastic vibrating regions 112 is supported by the central supporting axis 131 at the center of the elastic vibration plate 110.

Meanwhile, as shown in FIG. 1, the plurality of fan-like elastic vibrating regions 112 is formed into the mutually same fan-like shape. In addition, the plurality of piezoelectric vibrators 120 mounted on the plurality of elastic vibrating regions 112 is also formed into the mutually same disc shape.

More specifically, in the electroacoustic transducer 100 of the embodiment, the round elastic vibration plate 110 is divided into the plurality of elastic vibrating regions 112 having the same shape using the plurality of radial slits 111 as described above.

In addition, as shown in FIG. 3, the plurality of elastic vibrating regions 112 is supported by the cylindrical central supporting spindle 131 in a cantilever manner at a portion that locates at the center of the elastic vibration plate 110. A circular ring supporting body 132 having a circular ring shape is formed at the outer circumference of the round elastic vibration plate 110.

One main surface of the piezoelectric vibrator 120 is held by the elastic vibrating region 112 so as to form a divided vibrator 113. In addition, a plurality of the divided vibrators 113 is arrayed so as to surround the central supporting spindle 131.

Figure 4:
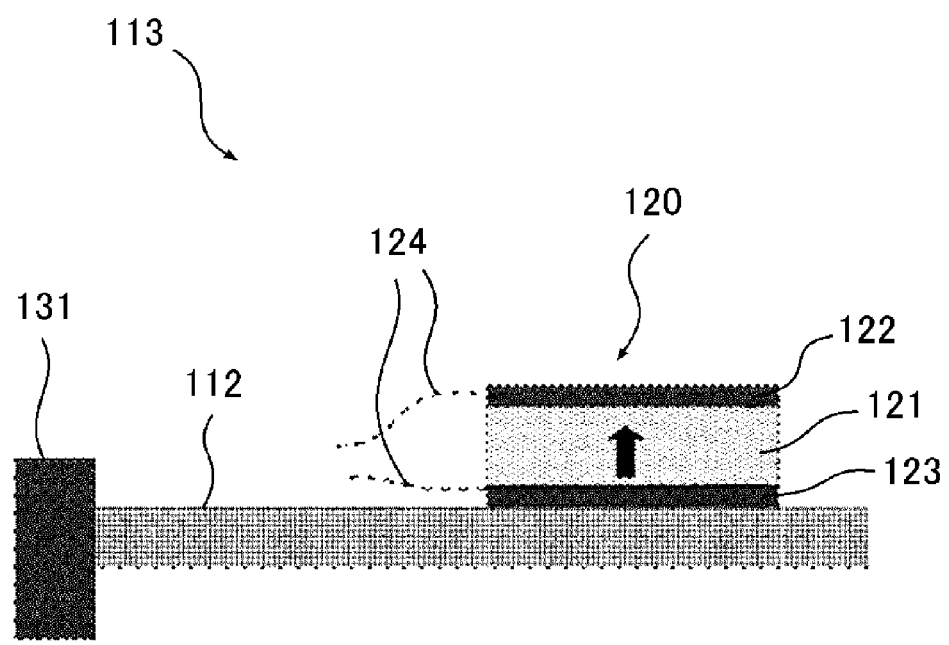
FIG. 4 is a vertical front cross-sectional view illustrating the structure of the main portions of the electroacoustic transducer.
Figure 8:
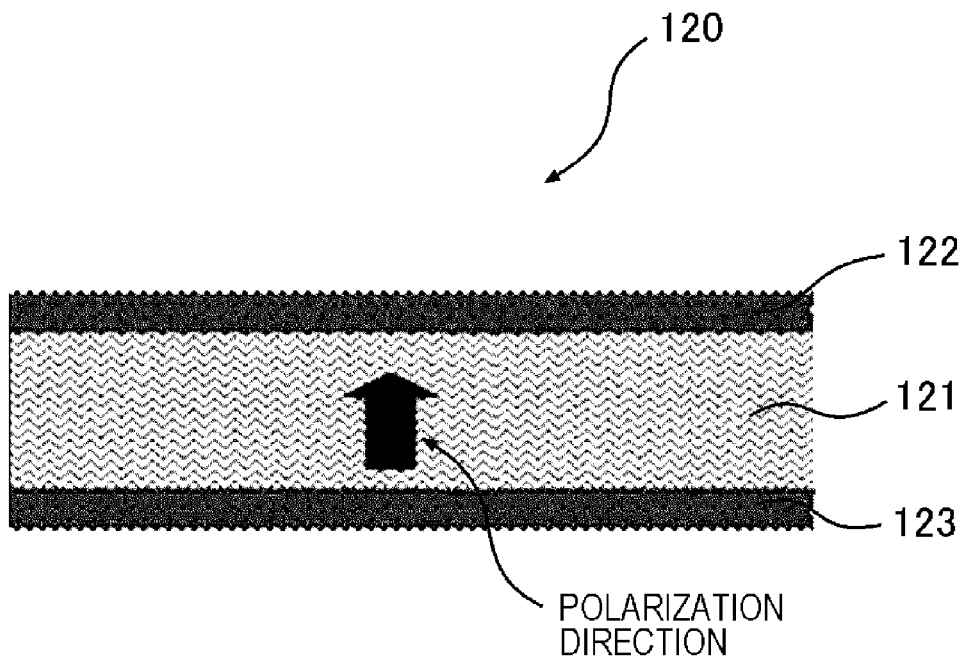
FIG. 8 is a schematic vertical front cross-sectional view illustrating the structure of a piezoelectric vibrator.

More specifically, as shown in FIGS. 4 and 8, the top and bottom main surfaces of a piezoelectric layer 121 composed of a piezoelectric material is held by a top electrode layer 122 and a bottom electrode layer 123 so that the piezoelectric vibrator 120 in each of the divided vibrators 113 is joined to the elastic vibrating region 112.

Meanwhile, the top/bottom electrode layers 122 and 123 are connected to a control portion 140 using lead wires 124. The piezoelectric vibrator 120 is driven in an audible range or an ultrasonic range using an electric field applied from the control portion 140.

A material that composes the piezoelectric layer 121 of the embodiment is not particularly limited as long as the material has a piezoelectric effect regardless of an inorganic material or an organic material, and it is possible to use a material having a high electromechanical transduction efficiency, for example, zirconate titanate (PZT), barium titanate ($BaTiO_3$), and the like.

In addition, the thickness of the piezoelectric layer 121 is not particularly limited, but is preferably more than or equal to 10 µm to less than or equal to 500 µm. For example, in a case in which a thin film of a ceramic material which is a brittle material having a thickness of less than 10 µm is used as the piezoelectric layer 121, there is a possibility of occurrence of cracking or damage in the piezoelectric layer 121 due to the weak mechanical strength during handling of the piezoelectric layer, and therefore it becomes difficult to handle the piezoelectric layer 121.

In addition, in a case in which a ceramic having a thickness of more than 500 µm is used as the piezoelectric layer 121, the transduction efficiency of transducing electrical energy to mechanical energy extremely lowers, and sufficient performances cannot be obtained as the electroacoustic transducer 100.

In general, in a piezoelectric ceramic in which an electrostrictive effect is generated through input of electrical signals, the transduction efficiency is dependent on the electric field intensity. Since the electric field intensity is expressed by (input voltage)/(thickness with respect to the polarization direction), an increase in the thickness inevitably results in a decrease in the transduction efficiency.

The top electrode layer 122 and the bottom electrode layer 123 are formed on the main surface of the piezoelectric vibrator 120 of the invention in order to generate an electric field. The top electrode layer 122 and the bottom electrode layer 123 are not particularly limited as long as the layers are made of electrically conductive materials, and silver or silver/palladium is preferably used. Silver is used as an ordinary low-resistance electrode layer, and is thus advantageous in terms of the manufacturing process, costs, and the like.

In addition, since silver/palladium is a low-resistance material that is excellent in terms of oxidation resistance, silver/palladium is advantageous from the viewpoint of reliability. In addition, the thicknesses of the top electrode layer 122 and the bottom electrode layer 123 are not particularly limited, but are preferably more than or equal to 1 µm to less than or equal to 50 µm.

For example, when the thicknesses of the top electrode layer 122 and the bottom electrode layer 122 and 123 are less than 1 µm, since the film thicknesses of the top electrode layer 122 and the bottom electrode layer 123 are thin, there is a possibility that the top electrode layer and the bottom electrode layer cannot be formed uniformly, and the transduction efficiency decreases. Meanwhile, an example of a technique that forms the top electrode layer 122 and the bottom electrode layer 123 having a thin film shape includes a method in which the top electrode layer and the bottom electrode layer are coated in a paste shape.

However, when the piezoelectric layer 121 is a polycrystalline material such as ceramic, since the surface state is a pearskin finish surface, the wetting state is poor during coating, and uniform electrode films cannot be formed when the top electrode layer and the bottom electrode layer do not have a certain extent of thickness.

On the other hand, in a case in which the film thicknesses of the top electrode layer 122 and the bottom electrode layer 123 exceed 100 µm, there is no particular problem with the manufacturing of the layers, but the top electrode layer 122 and the bottom electrode layer 123 become held surfaces with respect to a piezoelectric ceramic material which is the piezoelectric layer 121, and the energy transduction efficiency is decreased.

One main surface of the piezoelectric vibrator 120 in the electroacoustic transducer 100 of the embodiment is held by the elastic vibrating region 112. The elastic vibrating region 112 propagates vibrations generated from the piezoelectric vibrator 120 to the circular ring supporting body 132.

In addition, the elastic vibrating region 112 also has a function of adjusting the fundamental resonant frequency of the piezoelectric vibrator 120. As shown in a following formula, the mechanical fundamental resonant frequency f of the divided vibrator 113 is dependent on the load weight and compliance.

$$f = 1/(2\pi L\sqrt{(mC)})$$ [Formula 1]

Meanwhile, "m" represents the mass, and "C" represents the compliance.

Since the compliance is the machine stiffness of the divided vibrator 113, the fundamental resonant frequency can be controlled by controlling the stiffness of the piezoelectric vibrator 120.

For example, it becomes possible to shift the fundamental resonant frequency to a low range by selecting a material having a high modulus of elasticity or decreasing the thickness of the elastic vibrating region 112. On the other hand, it is possible to shift the fundamental resonant frequency to a high range by selecting a material having a high modulus of elasticity or increasing the thickness of the elastic vibrating region 112.

Conventionally, there was a problem with design limitation, costs, and reliability since the fundamental resonant frequency was controlled using the shape or material of the piezoelectric vibrator 120. In contrast to the above, in the embodiment, the fundamental resonant frequency can be easily adjusted to a desired value by changing the elastic vibrating region 112 which is a component member.

Meanwhile, a material that composes the elastic vibration plate 110 is not particularly limited as long as the material is a metal, a resin, or the like which has a higher modulus of elasticity than ceramic which is a brittle material, and an ordinary material such as phosphor bronze or stainless steel is preferable from the viewpoint of workability or costs.

In addition, the thickness of the elastic vibration plate 110 is preferably more than or equal to 5 µm to less than or equal to 1000 µm. In a case in which the thickness is less than 5 µm, there is a possibility that the mechanical strength of the elastic vibration plate 110 is weak, and the function as a holding member is impaired. In addition, an error in the mechanical vibration characteristics of the piezoelectric vibrator 120 is caused among manufacturing lots due to a decrease in the working precision.

In addition, in a case in which the thickness of the elastic vibration plate 110 exceeds 1000 µm, there is a problem in that the elastic vibration plate may be strongly held by the piezoelectric vibrator 120 due to an increase in the stiffness, and the vibration displacement amount may attenuate. In addition, the elastic vibration plate 110 of the embodiment preferably has a modulus of longitudinal elasticity which is an index indicating the stiffness of a material of more than or equal to 1 GPa to less than or equal to 500 GPa. As described above, in a case in which the stiffness of the elastic vibration plate 110 is excessively low or excessively high, there is a problem in that the characteristics or reliability of a machine vibrator may be impaired.

Figure 5:
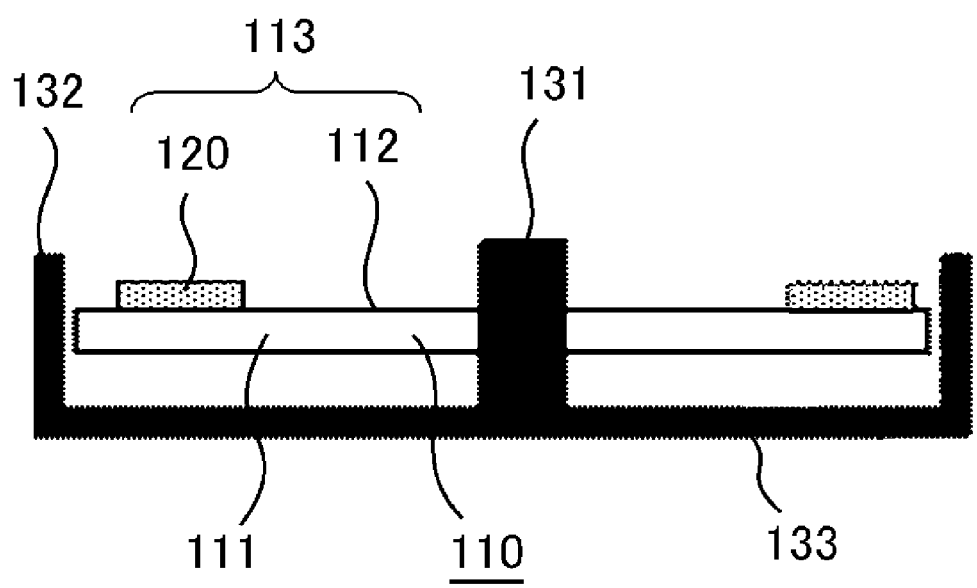
FIG. 5 is a vertical front cross-sectional view illustrating the structure of an electroacoustic transducer of a modified example.

The elastic vibration plate 110 in the electroacoustic transducer 100 of the embodiment is directly joined to the central supporting spindle 131. The central supporting spindle 131 plays a role of a fixing end, a material of the central supporting spindle should have a higher stiffness than the elastic vibration plate 110, and, for example, stainless steel, brass, or the like can be used. Meanwhile, as shown in FIG. 5, the central supporting spindle 131 may be joined to the circular ring supporting body 132 through a base member 133.

Hereinafter, a method of manufacturing the electroacoustic transducer 100 of the embodiment will be described. Firstly, the piezoelectric vibrator 120 is prepared. The piezoelectric vibrator 120 has the piezoelectric layer 121 having an outer diameter of Φ3 mm and a thickness of 200 µm. The top electrode layer 122 and the bottom electrode layer 123 having a thickness of 8 µm are formed on respective surfaces of the piezoelectric layer 121.

It is possible to use a lead zirconate titanate-based ceramic for the piezoelectric layer 121 and use a silver/palladium alloy (weight ratio 70%:30%) for the electrode layers. The piezoelectric layer 121 is manufactured using, for example, a green sheet method. Specifically, the piezoelectric layer 121 is fired over 2 hours at 1100° C. under the atmosphere, and then a polarization process is performed on the piezoelectric layer 121.

An epoxy-based adhesive can be used for both adhesion between the elastic vibration plate 110 having an outer diameter of Φ20 mm and the piezoelectric vibrator 120 and adhesion between the elastic vibration plate 110 and the central supporting spindle 131. The central supporting spindle 131 is made of SUS304, and the elastic vibration plate 110 is directly joined to the central supporting spindle 131.

In addition, corresponding to eight piezoelectric vibrators 120, eight radial slits 111 are formed so as to pinch the central supporting spindle 131 at the center. Thereby, eight elastic vibrating regions 112 having the same shape are formed so that the declination becomes 45 degrees.

Hereinafter, the operating principle of the electroacoustic transducer 100 of the embodiment will be described. The electroacoustic transducer 100 of the embodiment generates sound waves from the plurality of divided vibrators 113 disposed so as to surround the central supporting spindle 131.

Figure 6:
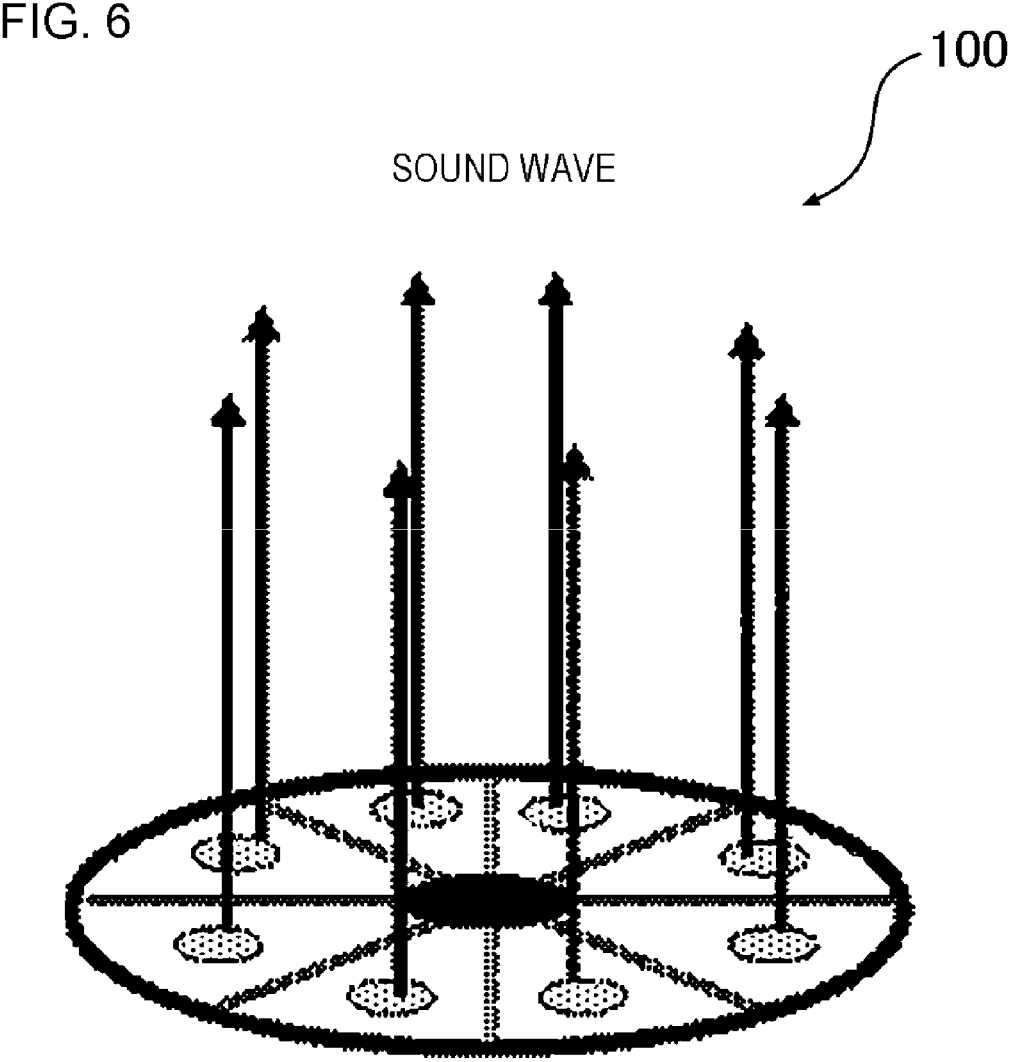
FIG. 6 is a schematic view illustrating the oscillation operation of the electroacoustic transducer.

The frequency of the sound waves is not particularly limited, but the sound waves being emitted are used as a transporter of modulation waves, and therefore the frequency of the sound waves is preferably outside the audible range. For example, 100 kHz or the like are appropriate for the frequency of the sound waves. Meanwhile, as shown in FIG. 6, the eight divided vibrators 113 perform oscillation in the present configuration.

In addition, it is possible to adjust the peak values of the oscillation frequencies of the plurality of divided vibrators 113 individually by, for example, adjusting the total length or horizontal width of the slit 111, adjusting the interior angle of the divided vibrator 113, changing the locations at which the piezoelectric vibrators 120 are mounted.

Hereinafter, a sound reproduction method using the electroacoustic transducer 100 of the embodiment will be described. In the configuration, the operating principle of a parametric speaker which is an acoustic reproducer in which ultrasonic waves are used as a transporter of modulation waves is used.

For example, when ultrasonic waves are radiated in the air through AM modulation, DSB modulation, SSB modulation, or FM modulation, audible sound is generated due to the non-linear characteristics when ultrasonic waves propagate in the air.

Examples of the non-linear characteristics include a phenomenon in which a laminar flow is shifted to a turbulent flow when the Reynolds number which is indicated by the ratio of the inertial action to the viscous action of the flow is increased.

Sound waves finely disturb in a fluid, and thus non-linearly propagate. However, in a low-frequency range, the amplitude of sound waves is non-linear, but the amplitude difference is extremely small, and, generally, sound waves are handled as a phenomenon of a linear theory. In contrast to the above, in an ultrasonic wave range, the non-linearity can be easily observed, and, in a case in which sound waves are radiated in the air, harmonics are generated significantly in accordance with the non-linearity.

In summary, sound waves are in a loose and dense state in which concentrations of molecular groups are mixed in the air, and, in a case in which it takes time for air molecules to be restored from compression, air molecules that cannot be restored after compression collide with continuously propagating air molecules. Thereby, impact waves are generated so as to generate audible sound.

Figure 7:
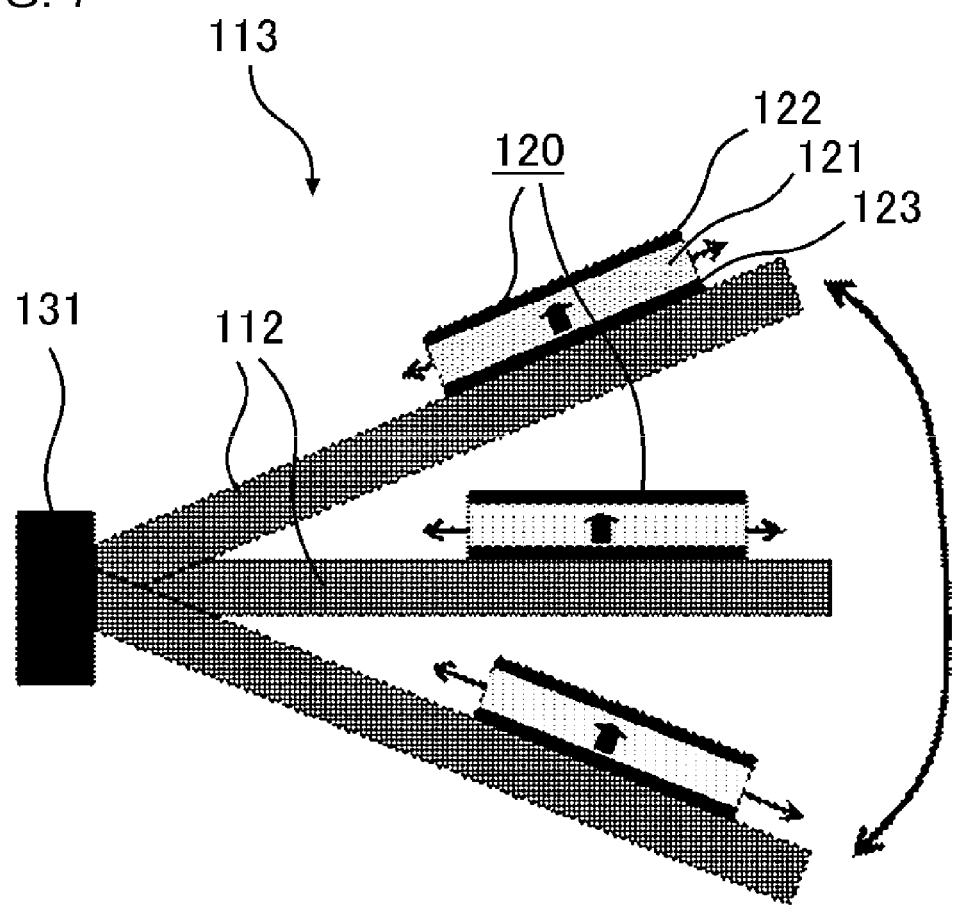
FIG. 7 is a schematic view illustrating the oscillation operation of the electroacoustic transducer.

Subsequently, the operating principle of the piezoelectric vibrator 120 will be described. As shown in FIG. 7, the piezoelectric layer 121 is composed of piezoelectric plates (piezoelectric ceramic) having two main surfaces as described above, and the top electrode layer 122 and the bottom electrode layer 123 are formed on the respective main surfaces of the piezoelectric layer 121.

The polarization direction in the piezoelectric layer 121 is not particularly limited, and is a vertical direction (the thickness direction of the piezoelectric vibrator 120) in the electroacoustic transducer of the embodiment. The piezoelectric vibrator 120 configured as described above makes elastic motions in the radius direction (diameter-enlarging motions) in which both main surfaces enlarge or shrink at the same time when an alternating voltage is applied to the top electrode layer 122 and the bottom electrode layer 123 so that an alternating electric filed is supplied as shown in FIG. 7.

In addition, the piezoelectric vibrator 120 makes motions in which a first deformation mode in which the main surfaces enlarge and a second deformation mode in which the main surfaces shrink are repeated. Due to the repetition of the above motions, the elastic vibrating region 112 generates vertical vibrations through an inertial action and a restoration action using the central supporting spindle 131 as a pivot point and the elastic effect of the elastic vibrating region 112, thereby generating sound waves.

As described above, the electroacoustic transducer 100 of the embodiment can reproduce a large sound volume with a small size. In addition, since the electroacoustic transducer uses ultrasonic waves, the directionality is narrow, and the industrial value is large in terms of the privacy protection of a user and the like.

Figure 9:
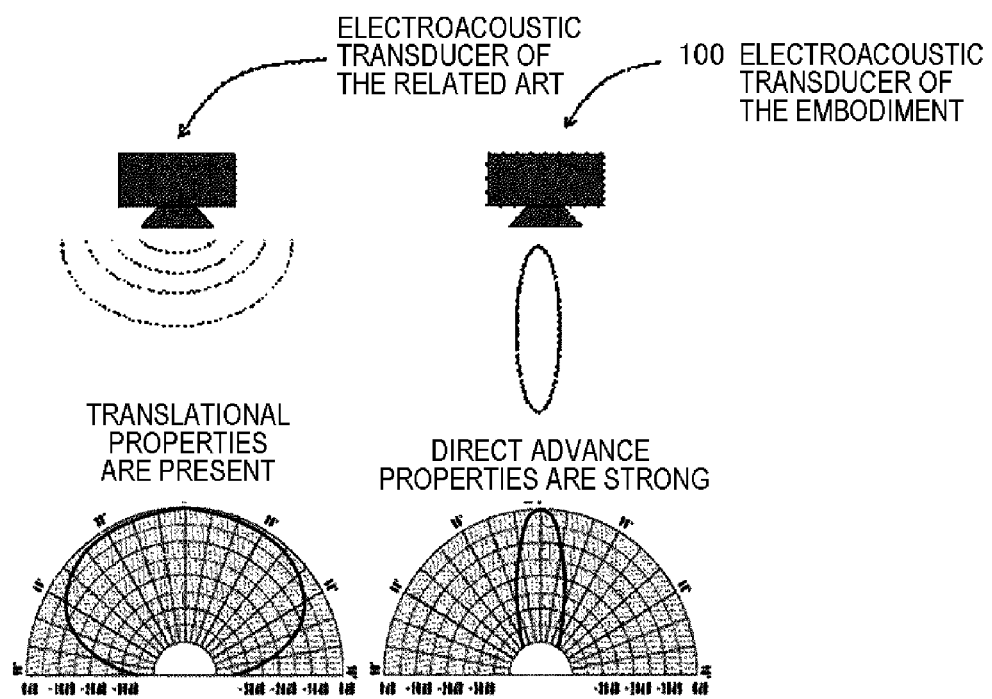
FIG. 9 is a schematic view illustrating the oscillation operation of the electroacoustic transducers of the embodiment and a related art example.

That is, as shown in FIG. 9, compared to electroacoustic transducers of the related art, the electroacoustic transducer 100 of the embodiment generates sound waves having favorable direct advance properties, and can selectively propagate sound waves to desired locations at which the sound waves are delivered to a user.

Figure 18:
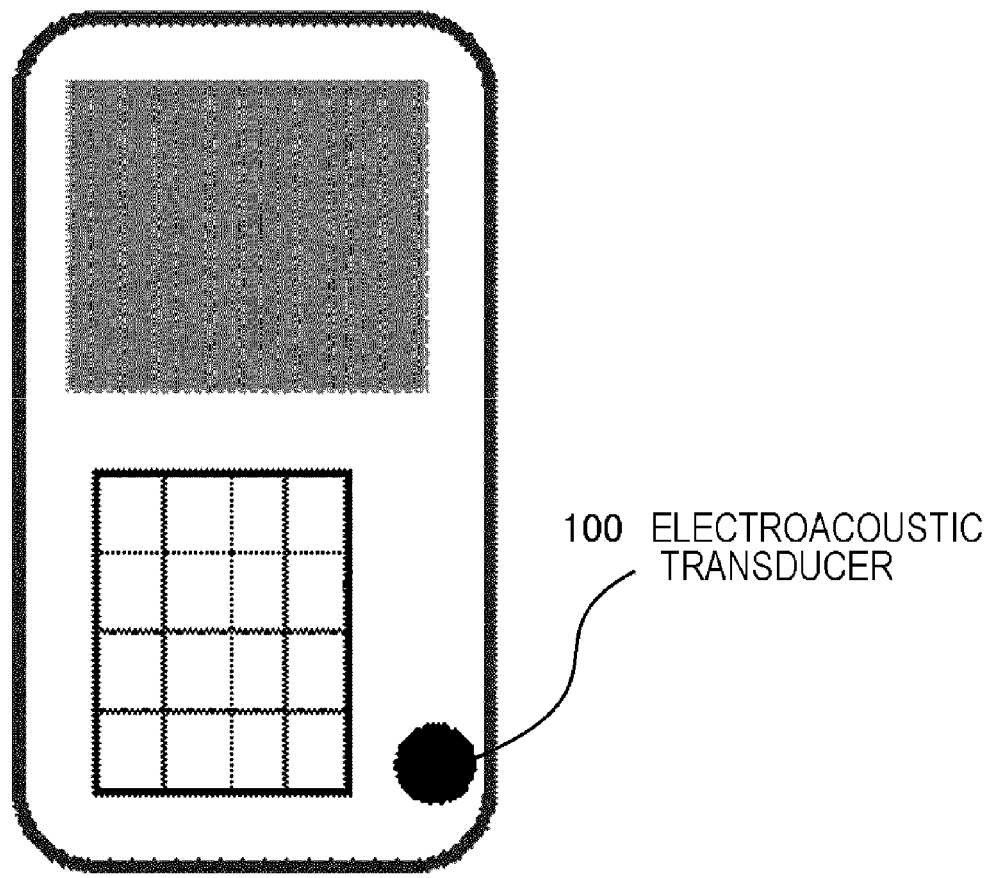
FIG. 18 is a schematic front view illustrating the appearance of a mobile phone which is an electronic device of an embodiment of the invention.

In addition, the electroacoustic transducer 100 of the embodiment can also be used as a sound source of electronic devices (for example, mobile phones as shown in FIG. 18, notebook computers, small game players, and the like). Furthermore, since an increase in the size of the electroacoustic transducer 100 can be prevented, and the acoustic characteristics improve, the electroacoustic transducer of the embodiment can be preferably used for mobile electronic devices.

Second Embodiment

Figure 10:
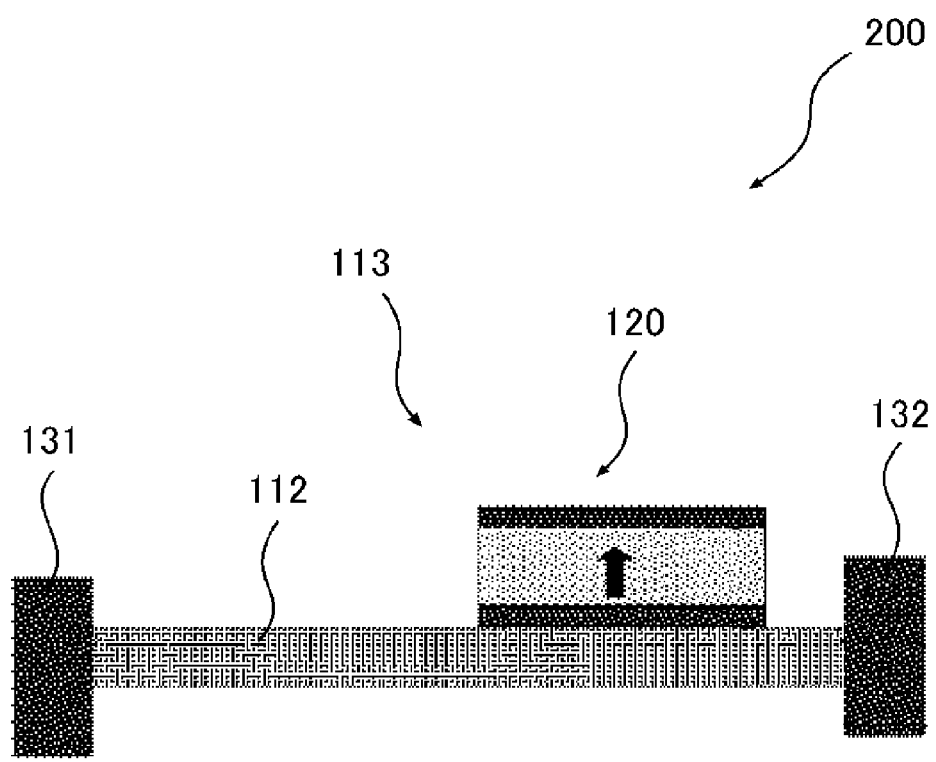
FIG. 10 is a vertical front cross-sectional view illustrating the structure of the main portions of an electroacoustic transducer of a second embodiment of the invention.

A second embodiment of the invention will be described hereinafter with reference to FIG. 10. Meanwhile, in the embodiment of the invention exemplified below, the same portions as in the first embodiment will not be described.

An electroacoustic transducer 200 which is an oscillator of the embodiment is different from the electroacoustic transducer 100 of the first embodiment in that the elastic vibrating region 112 is supported at both ends of the central supporting spindle 131 and the circular ring supporting body 132.

In this case, the fundamental resonant frequency of the divided vibrator 113 increases, but the fact that the elastic vibrating region is supported at both ends generates a breakdown effect, and a higher sound pressure can be emitted through an increase in the vibration amount.

As described above, the electroacoustic transducer 100 of the embodiment can generate a higher sound pressure than that of the first embodiment. In addition, the electroacoustic transducer of the embodiment can also be used as a sound source of electronic devices (for example, mobile phones, notebook computers, small game players, and the like). Furthermore, since an increase in the size of the electroacoustic transducer 100 can be prevented, and the acoustic characteristics improve, the electroacoustic transducer of the embodiment is also preferable used as a sound source of mobile electronic devices.

Third Embodiment

Figure 11:
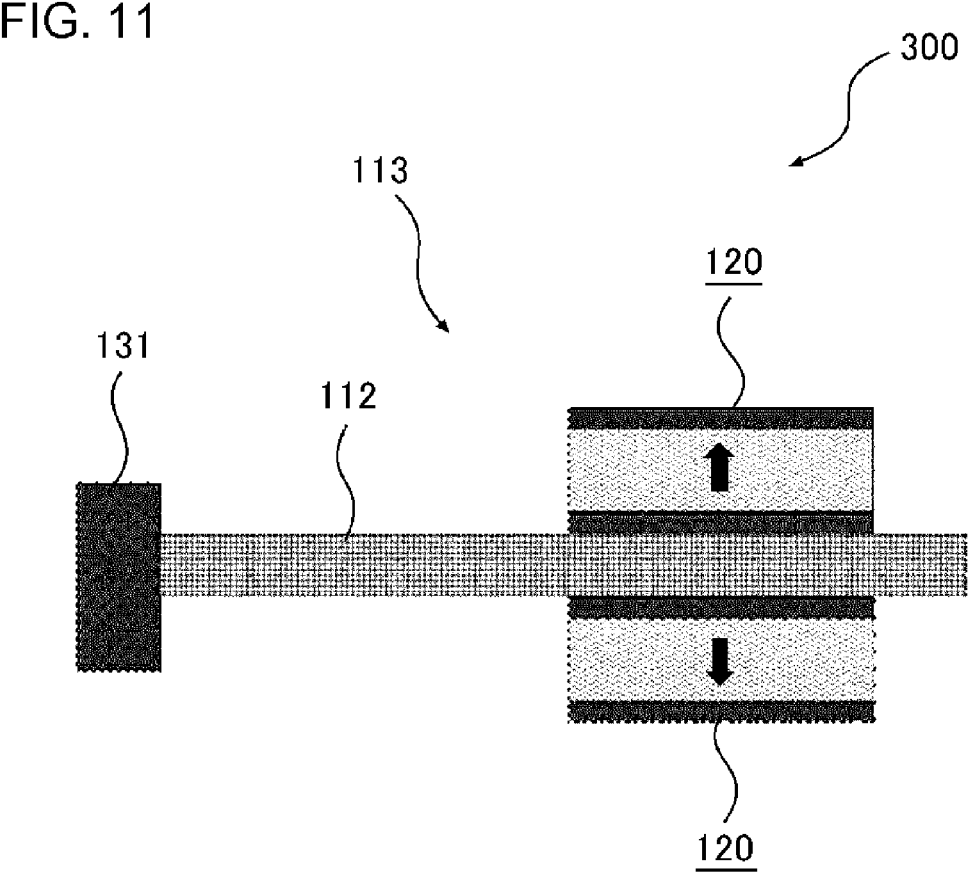
FIG. 11 is a vertical front cross-sectional view illustrating the structure of the main portions of an electroacoustic transducer of a third embodiment of the invention.

A third embodiment of the invention will be described hereinafter with reference to FIG. 11. An electroacoustic transducer 300 which is an oscillator of the embodiment is different from the electroacoustic transducer 100 of the first embodiment in that the elastic vibrating region 112 is held by two piezoelectric vibrators 120.

That is, the electroacoustic transducer 300 has a bimorph structure in which two piezoelectric vibrators 120 are used. The bimorph-type piezoelectric vibrator 120 has a structure in which two sheets of piezoelectric ceramic having opposite polarization directions as shown in the drawing are disposed opposite to each other through the elastic vibrating region 112 (elastic vibration plate 110). In addition, the elastic vibration plate 110 is bended by stretching one of the piezoelectric vibrators 120 in the longitudinal direction and shrinking the other of the piezoelectric vibrators 120.

Due to the above fact, it becomes possible to obtain a larger displacement compared to a unimorph structure composed of a single piezoelectric vibrator 120 of the first embodiment. Meanwhile, for the two piezoelectric vibrators 120, the same piezoelectric material as in the first embodiment can be used.

Furthermore, it is also possible to make the electroacoustic transducer 300 operate as a parametric speaker by applying a high-frequency electric field to the piezoelectric vibrator 120.

In addition, the two piezoelectric vibrators 120 may have the mutually same shape or the mutually different shapes.

sound waves are provided in the lid, and the partition plates 511 and the lid 510 are composed of the same material as for the circular ring supporting body 132.

Similarly to the second embodiment, an increase in the size of the electroacoustic transducer 100 can be prevented, and the acoustic characteristics improve. Here, the test results of the electroacoustic transducers 100 to 500 of the respective embodiments are exemplified in the following as Examples 1 to 5.

TABLE 1

|  | COMPARATIVE EXAMPLE 1 | EXAMPLE 1 | EXAMPLE 2 | EXAMPLE 3 | EXAMPLE 4 | EXAMPLE 5 |
| --- | --- | --- | --- | --- | --- | --- |
| SOUND PRESSURE LEVEL (1 KHz) | 77 | 89 dB | 86 dB | 94 dB | 94 dB | 85 dB |
| SOUND PRESSURE LEVEL (3 KHz) | 75 | 90 dB | 84 dB | 93 dB | 91 dB | 94 dB |
| SOUND PRESSURE LEVEL (5 KHz) | 76 | 93 dB | 87 dB | 90 dB | 90 dB | 96 dB |
| SOUND PRESSURE LEVEL (10 KHz) | 97 | 91 dB | 94 dB | 94 dB | 89 dB | 93 dB |
| FLATNESS OF FREQUENCY CHARACTERISTIC | x | ○ | ○ | ○ | ○ | ○ |
| DROP IMPACT STABILITY | x | ○ | ○ | ○ | ○ | ○ |

Similarly to the second embodiment, an increase in the size of the electroacoustic transducer 100 can be prevented, and the acoustic characteristics improve.

Fourth Embodiment

Figure 12:
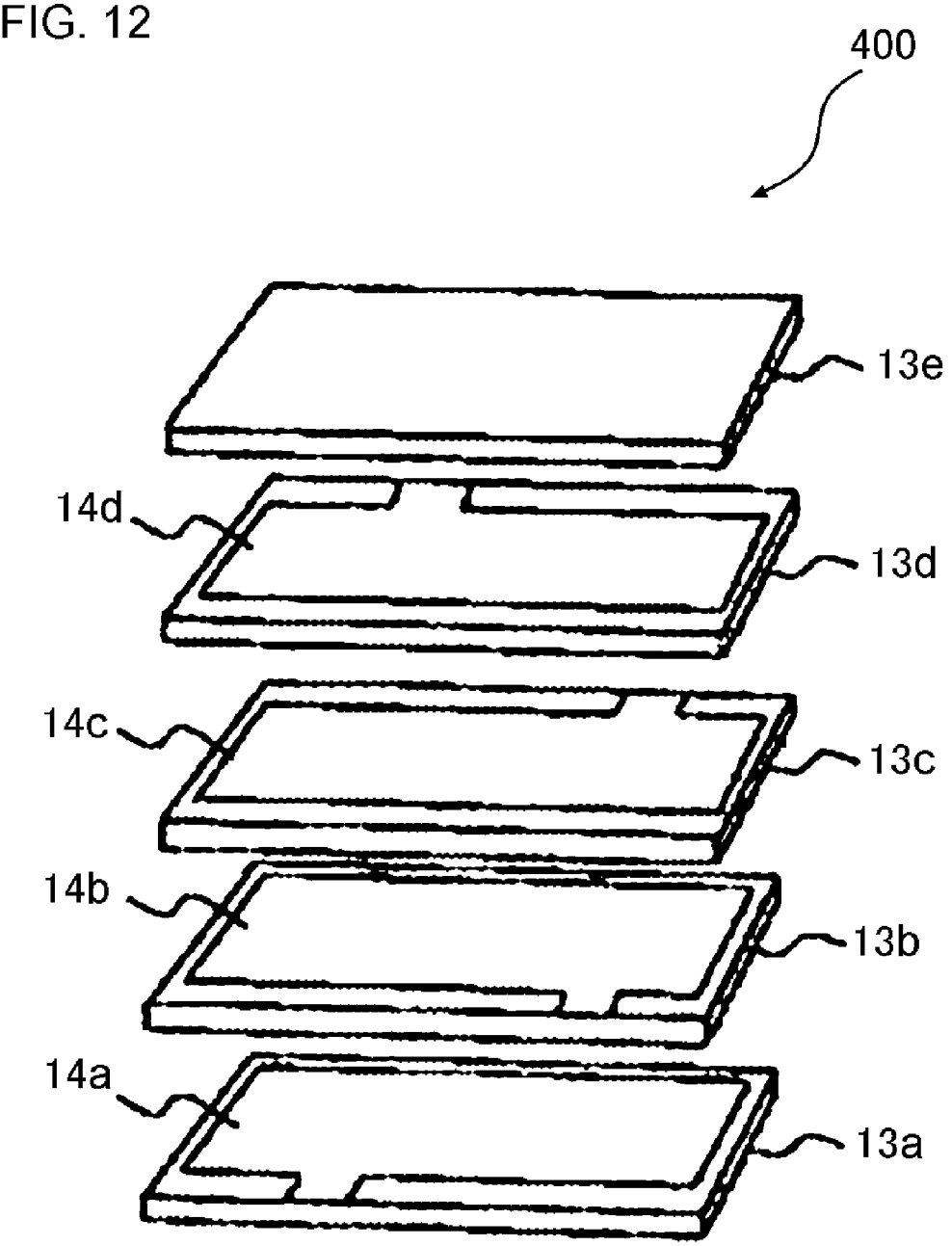
FIG. 12 is an exploded perspective view illustrating the structure of a piezoelectric vibrator of an electroacoustic transducer of a fourth embodiment of the invention.

A fourth embodiment of the invention will be described with reference to FIG. 12. An electroacoustic transducer of the embodiment has a lamination-type piezoelectric vibrator 400. As shown in the drawing, the piezoelectric vibrator 400 has a multilayer structure in which five layers of piezoelectric layers 13a to 13e composed of the piezoelectric layer 13 are laminated.

An electrode layer (conductor layer) 14a to 14d is formed between the piezoelectric layers 13. The polarization directions in the respective piezoelectric layers 13a to 13e change opposite, and are configured to be alternately opposite to the orientation of the electric field.

According to the piezoelectric vibrator 400 having the above lamination structure, since the electric field intensity generated between the electrode layers is high, the overall driving force of the piezoelectric vibrator 400 improves by an extent that corresponds to the number of the piezoelectric layers 13 laminated.

The electroacoustic transducer 100 according to the embodiment can also be used as a sound source of electronic devices (for example, mobile phones, notebook computers, small game players, and the like). In this case, since an increase in the size of the electroacoustic transducer 100 can be prevented, and the acoustic characteristics improve, the electroacoustic transducer of the embodiment is also preferable used as a sound source of mobile electronic devices.

Fifth Embodiment

Figure 13:
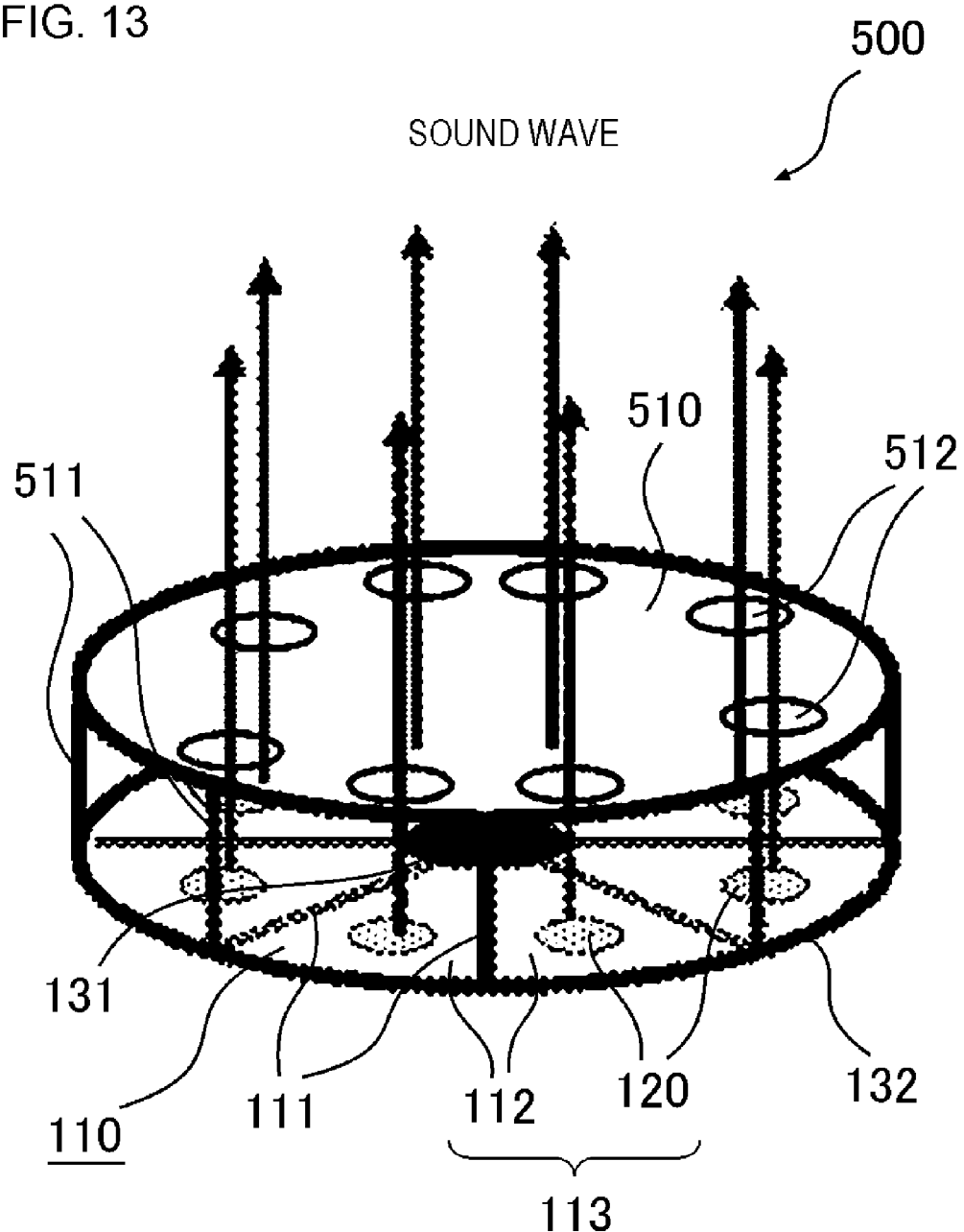
FIG. 13 is a schematic perspective view illustrating the structure of an electroacoustic transducer of a fifth embodiment of the invention.

A fifth embodiment of the invention will be described with reference to FIG. 13. In an electroacoustic transducer 500 of the embodiment, a respective plurality of the divided vibrators 113 are isolated using a lid 510 and partition plates 511.

The divided vibrators 113 are isolated in the above manner so that interruption of sound waves in the vicinity of the oscillation portion is prevented, and the directional characteristics improve. In addition, sound holes 512 for passing Furthermore, the test results in a case in which the electroacoustic transducers 100 to 500 of the respective embodiments are bonded to inside of a mobile phone are exemplified in the following as Examples 6 to 10.

TABLE 2

|  | EXAMPLE 6 | EXAMPLE 7 | EXAMPLE 8 | EXAMPLE 9 | EXAMPLE 10 |
| --- | --- | --- | --- | --- | --- |
| SOUND PRESSURE LEVEL (1 KHz) | 85 dB | 87 dB | 87 dB | 88 dB | 94 dB |
| SOUND PRESSURE LEVEL (3 KHz) | 86 dB | 88 dB | 88 dB | 91 dB | 96 dB |
| SOUND PRESSURE LEVEL (5 KHz) | 84 dB | 89 dB | 92 dB | 94 dB | 98 dB |
| SOUND PRESSURE LEVEL (10 KHz) | 86 dB | 90 dB | 93 dB | 94 dB | 98 dB |
| DROP IMPACT STABILITY | ○ | ○ | ○ | ○ | ○ |

Sixth Embodiment

Figure 14:
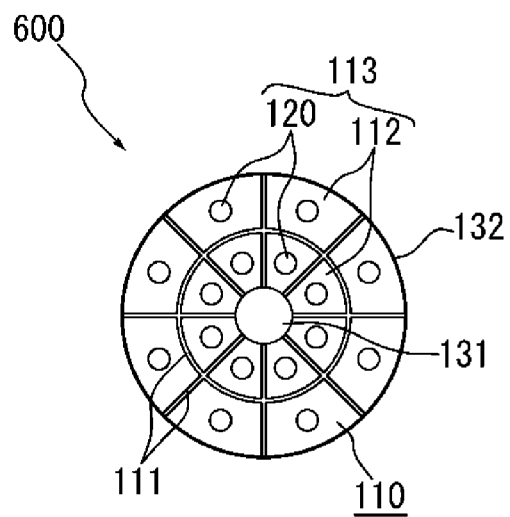
FIG. 14 is a plan view illustrating the structure of an electroacoustic transducer of a sixth embodiment of the invention.

A sixth embodiment of the invention will be described with reference to FIG. 14. An electroacoustic transducer 600 which is an oscillator of the embodiment is different from the electroacoustic transducer 100 of the first embodiment in the following points. Firstly, the elastic vibrating region 112 is divided into two parts concentrically in the diameter direction using the circular slit 111. In addition, the respective divided areas are supported by the central supporting spindle 131 and the circular ring supporting body 132.

Since the piezoelectric vibrators 120 are mounted on the respective two divided elastic vibrating regions 112, the number of the divided vibrators 113 doubles. Therefore, it is possible to oscillate a higher sound pressure than in the electroacoustic transducer 100 of the first embodiment.

Similarly to the second embodiment, an increase in the size of the electroacoustic transducer 100 can be prevented, and the acoustic characteristics improve.

Seventh Embodiment

Figure 15:
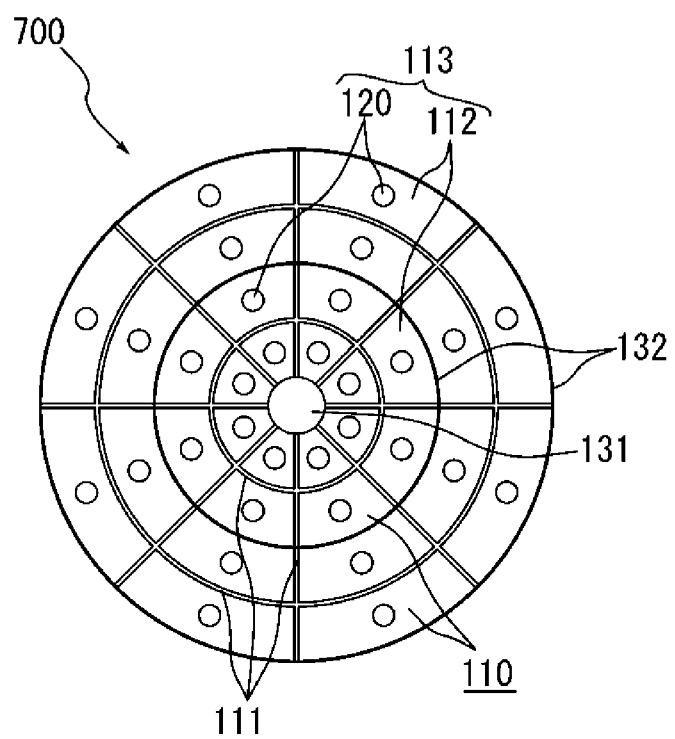
FIG. 15 is a plan view illustrating the structure of an electroacoustic transducer of a seventh embodiment of the invention.

A seventh embodiment of the invention will be described with reference to FIG. 15. In an electroacoustic transducer 700 which is an oscillator of the embodiment, a large-diameter circular ring supporting body 132 is further disposed at the outer circumference compared to the electroacoustic transducer 600 of the sixth embodiment.

The elastic vibrating region 112 is divided into more than or equal to three parts, for example, four parts in a concentric shape using a plurality of circular slits 111 having mutually different diameters. The divided elastic vibrating regions 112 are supported by the inside and outside circular ring supporting bodies 132 respectively.

In the electroacoustic transducer 700 of the embodiment, the piezoelectric vibrator 120 is mounted on each of the elastic vibrating regions 112 divided into more than or equal to three parts in the diameter direction as described above. Therefore, since the number of the divided vibrators 113 further increases compared to that of the electroacoustic transducer 600 of the sixth embodiment, it is possible to oscillate a higher sound pressure.

Similarly to the second embodiment, in the embodiment, an increase in the size of the electroacoustic transducer 100 can be prevented, and the acoustic characteristics improve.

Eighth Embodiment

Figure 16:
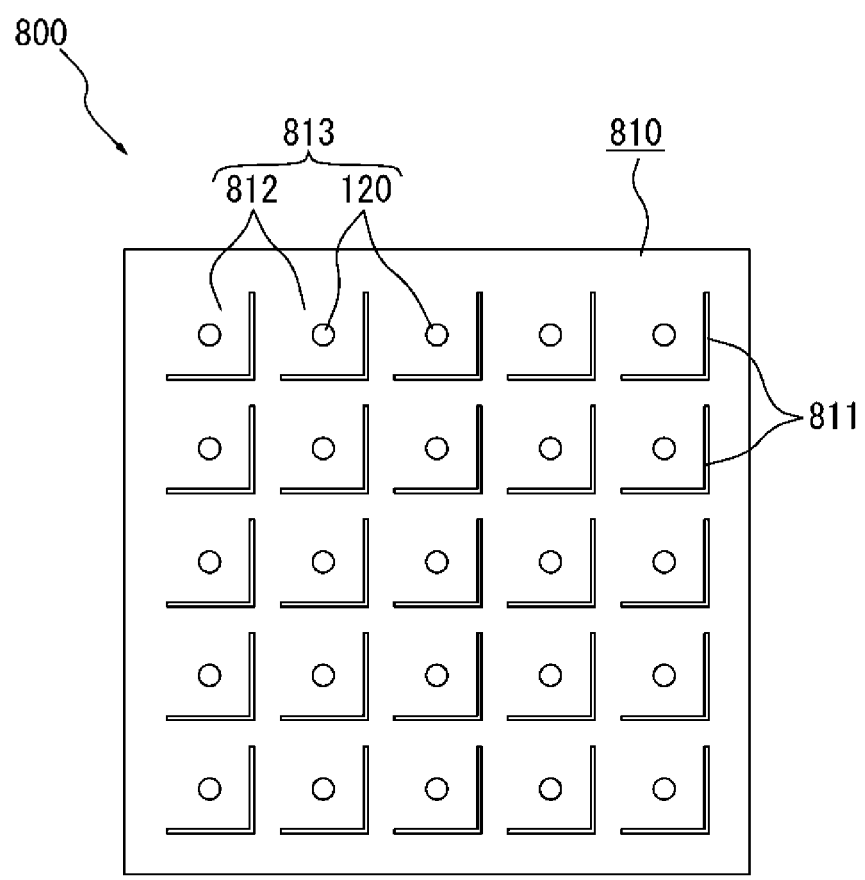
FIG. 16 is a plan view illustrating the structure of an electroacoustic transducer of an eighth embodiment of the invention.

An eighth embodiment of the invention will be described with reference to FIG. 16. In an electroacoustic transducer 800 which is an oscillator of the embodiment, a rectangular elastic vibration plate 810 is divided into a plurality of rectangular elastic vibrating regions 812 through a plurality of L-shape slits 811.

The piezoelectric vibrator 120 is mounted on each of the plurality of elastic vibrating regions 812 in the elastic vibration plate 810. Thereby, a plurality of rectangular divided vibrators 813 is formed into a matrix shape. In the electroacoustic transducer 800 of the embodiment, since the plurality of divided vibrators 813 arrayed in a matrix as described above oscillates, it is possible to oscillate a high-output sound pressure.

Similarly to the second embodiment, in the embodiment, an increase in the size of the electroacoustic transducer 100 can be prevented, and the acoustic characteristics improve.

Ninth Embodiment

Figure 17:
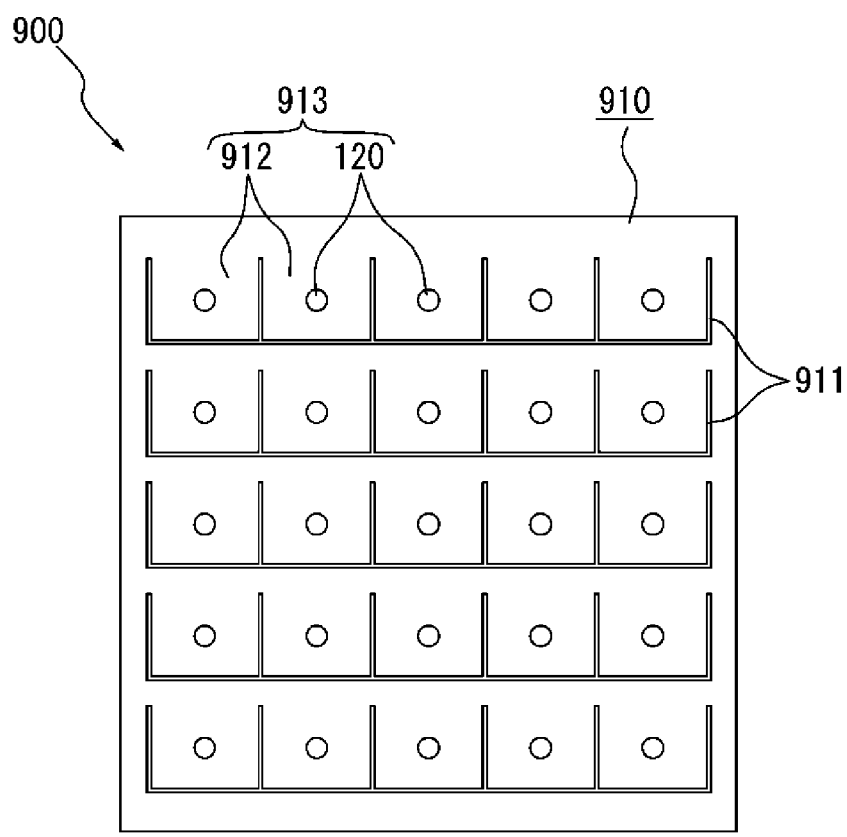
FIG. 17 is a plan view illustrating the structure of an electroacoustic transducer of a ninth embodiment of the invention.

A ninth embodiment of the invention will be described with reference to FIG. 17. In an electroacoustic transducer 900 which is an oscillator of the embodiment, a rectangular elastic vibration plate 910 is divided into a plurality of rectangular elastic vibrating regions 912 through a plurality of U-shape slits 911. However, in the electroacoustic transducer 900 of the embodiment, the plurality of U-shape slits 911 is coupled in a shape in which an adjacent side is shared.

The plurality of piezoelectric vibrators 120 is mounted on the plurality of elastic vibrating regions 912 in the elastic vibration plate 910 so as to form a plurality of rectangular divided vibrators 913 in a matrix shape. In the electroacoustic transducer 900 of the embodiment, since the plurality of divided vibrators 913 arrayed in a matrix as described above oscillates, it is possible to oscillate a high-output sound pressure.

Similarly to the second embodiment, in the embodiment, an increase in the size of the electroacoustic transducer 100 can be prevented, and the acoustic characteristics improve.

Meanwhile, the invention is not limited to the embodiments, and a variety of modifications are permitted within the scope of the purport of the invention. For example, in the electroacoustic transducer 100 of the embodiment, the plurality of elastic vibrating regions 112 was assumed to be formed into the same shape and the same size. However, the shape or size of the plurality of elastic vibrating regions 112 may be different (not shown).

Similarly, even in the rectangular electroacoustic transducers 800 and 900, the plurality of rectangular divided vibrators 813 and 913 were assumed to be formed into the same shape and the same size. However, the shape or size of the plurality of divided vibrators 813 and 913 may be different (not shown).

In addition, it was shown in the drawing that, in the electroacoustic transducer 700, the respective portions are formed to be doubled compared to the electroacoustic transducer 600. However, the respective portions may be formed to be tripled or more (not shown).

Furthermore, in the electroacoustic transducer 100 and the like of the embodiments, examples of the plurality of piezoelectric vibrators 120 being formed into the same shape and the same size in the same structure were shown. However, the structure, shape, and size may be different (not shown).

In addition, in the embodiments, a mobile phone that outputs sound using the electroacoustic transducer 100 or the like was shown as an example of an electronic device as shown in FIG. 18. However, the electronic device may be a sonar (not shown) having the electroacoustic transducer 100 or the like which is an oscillator, an ultrasonic detection portion that detects ultrasonic waves which has been emitted from the electroacoustic transducer 100 or the like and has been reflected at a measurement subject, and a distance measurement portion that computes the distance to the measurement subject from the detected ultrasonic waves.

Meanwhile, it is needless to say that the plurality of embodiments and a plurality of modified examples may be combined within the scope of the contents of the invention. In addition, in the above embodiments, the structures and the like of the respective portions have been described specifically, but the structures and the like can be modified in various manners within the scope in which the invention is satisfied.

The present application claims priority based on Japanese Unexamined patent publication No. 2010-166549, filed on Jul. 23, 2010, the content of which is incorporated herein by reference.

The invention claimed is:

1. An oscillator comprising:
an elastic vibration plate which is divided into a plurality of elastic vibrating regions through radial slits;
a supporting member that supports the plurality of elastic vibrating regions at an inner non-slit location; and
a plurality of piezoelectric vibrators which are individually mounted on at least some of the plurality of elastic vibrating regions supported by the supporting member and undergo elastic vibration due to application of an electric field,
wherein the supporting member does not support the plurality of elastic vibrating regions at an outer non-slit location.

2. The oscillator according to claim 1,
wherein the plurality of elastic vibrating regions are supported at a center.

3. The oscillator according to claim 1,
wherein the elastic vibration plate is formed into a circular shape.

4. The oscillator according to claim 1,
wherein the elastic vibration plate is divided into the plurality of elastic vibrating regions having a rectangular shape using a plurality of L-shape or U-shape slits.

5. The oscillator according to claim 4, wherein the elastic vibration plate is formed into a rectangular shape.

6. The oscillator according to claim 1, wherein the plurality of elastic vibrating regions are formed into the same shape.

7. The oscillator according to claim 1, wherein the plurality of piezoelectric vibrators mounted in the plurality of elastic vibrating regions are formed into the same shape.

8. An electronic device comprising:
the oscillator according to claim 1; and
an oscillation driving portion that causes the oscillator to output audible sound waves.

9. An electronic device comprising:
the oscillator according to claim 1;
an ultrasonic detection portion that detects ultrasonic waves which are emitted from the oscillator and reflected by a measurement subject; and
a distance measurement portion that computes the distance to the measurement subject from the detected ultrasonic waves.

\* \* \* \* \*

UNITED STATES PATENT AND TRADEMARK OFFICE
CERTIFICATE OF CORRECTION

PATENT NO. : 8,891,333 B2  Page 1 of 1
APPLICATION NO. : 13/703718
DATED : November 18, 2014
INVENTOR(S) : Yasuharu Onishi et al.

It is certified that error appears in the above-identified patent and that said Letters Patent is hereby corrected as shown below:

In the Specification

Column 5, Line 36: Delete "$f=1/(2\pi L\sqrt{}/(mC))$" and insert -- $f = 1/(2\pi L\sqrt{(mC)})$ --

Signed and Sealed this
Eighteenth Day of August, 2015

Michelle K. Lee
*Director of the United States Patent and Trademark Office*